United States Patent [19]
Maida

[11] 3,980,400
[45] Sept. 14, 1976

[54] ELECTROMAGNETIC TRIGGER DEVICE IN MOTOR-DRIVEN CAMERA CAPABLE OF BULB EXPOSURE

[75] Inventor: Osamu Maida, Tokyo, Japan
[73] Assignee: Nippon Kogaku K.K., Tokyo, Japan
[22] Filed: Mar. 10, 1975
[21] Appl. No.: 557,041

[30] Foreign Application Priority Data
Mar. 14, 1974 Japan.................................. 49-28564

[52] U.S. Cl................................ 352/169; 352/121; 352/137; 354/173
[51] Int. Cl.²......................................... G03B 21/38
[58] Field of Search.................... 352/137, 121, 169; 354/173

[56] References Cited
UNITED STATES PATENTS
3,705,764  12/1972  Reinsch .............................. 352/169
3,722,989  3/1973  Inoue.................................. 352/169

Primary Examiner—Russell E. Adams, Jr.
Attorney, Agent, or Firm—Shapiro and Shapiro

[57] ABSTRACT

This invention relates to an electromagnetic trigger device in a motor-driven camera for effecting bulb exposure in which the shutter is kept open during depression of the shutter release button. By depression of the shutter release button, discharge current from a first capacitor directly or indirectly energizes a electromagnet to drive a shutter driving mechanism. A latching lever stops the shutter driving mechanism in an open shutter position. By release of the button, discharge current from a second capacitor directly or indirectly energizes the electromagnet to drive the shutter driving mechanism. The latching lever stops the shutter driving mechanism in a closed shutter position, thus accomplishing the bulb exposure.

16 Claims, 11 Drawing Figures

ELECTROMAGNETIC TRIGGER DEVICE IN MOTOR-DRIVEN CAMERA CAPABLE OF BULB EXPOSURE

BACKGROUND OF THE INVENTION

1. Field of the Invention

This invention relates to an electromagnetic trigger device in a motor-driven camera capable of effecting bulb exposure.

2. Description of the Prior Art

There has been proposed a motor-driven camera such as, for example, a cine camera which is provided with a member for stopping the shutter at the position where the shutter is kept opened (to be referred to as the opened shutter position hereinafter) in order to attain a long exposure time required under the low or poor lighting condition such as the exposure at night or the microscopic photography, and with a member for stopping the shutter at the position where the shutter is kept closed (to be referred to as the closed shutter position hereinafter). The motor-driven camera of type described are for instance disclosed in U.S. Pat. Nos. 3,721,492 and 3,722,989. However, with the camera described in U.S. Pat. No. 3,721,492, when a release button is operated for terminating a long time exposure, a shutter is closed, and the next frame of film is transported and successively the next exposure is initiated. Therefore, this camera is not advantageously adapted for use in the microscopic photography in which each frame must be exposed for a relatively long time, for instance 20 seconds, and the interval between the successive two exposures must be also longer, for instance 5 minutes. The camera disclosed in U.S. Pat. No. 3,722,989 has disadvantage in that consumption of the power source is remarkable because a current flows to an electromagnet during opening of the shutter even if a long exposure time is selected.

SUMMARY OF THE INVENTION

It is a primary object of the present invention to provide a improved electromagnetic trigger device in a motor-driven camera capable of bulb exposure which ensures that during depression of the shutter releases button the shutter is opened whereupon there is no consumption of the power source and by release of the button the shutter is closed and the camera is stopped. Another object is to provide an electromagnetic trigger in a motor-driven camera capable of bulb exposure and continuous exposure which ensures that in the continuous exposure the shutter is stopped in its closed position independently of the timing with which the release button is released.

According to the present invention, an electromagnetic trigger device in a motor-driven camera capable of the bulb exposure comprises a power source, a motor, a trigger switch means, shutter driving means driven by said motor for driving a shutter and movable between a closed shutter position in which the shutter is fully closed and an open shutter position in which the shutter is fully open, latching means movable between a latching position and a non-latching position, said latching means being adapted, when moved to said latching position, to latch said shutter driving means which occupies one of the closed and open shutter positions, a motor switch for electrically connecting said motor to said power source when said latching means is in the non-latching position, electromagnetic means for attracting said latching means to move it to the non-latching position when said electromagnetic means is energized, a pair of first and second capacitors connectable to said electromagnetic means, said capacitors being so interlocked with said trigger switch means that said first capacitor is connected to said electromagnetic means to energize it for a predetermined time interval when said trigger switch means is moved to an operative position and that said second capacitor is connected to said electromagnetic means to energize it for a predetermined time interval when said trigger switch means is moved to an inoperative position, said first and second mentioned predetermined time interval being shorter than the shorter of the time required for said shutter driving means to move from the closed shutter position to the open shutter position and the time required for said shutter driving means to move from the open shutter position to the closed shutter position.

DESCRIPTION OF THE PREFERRED EMBODIMENTS

In all Figures the same parts or equivalent part are all designed by the same reference number.

Figure 1:
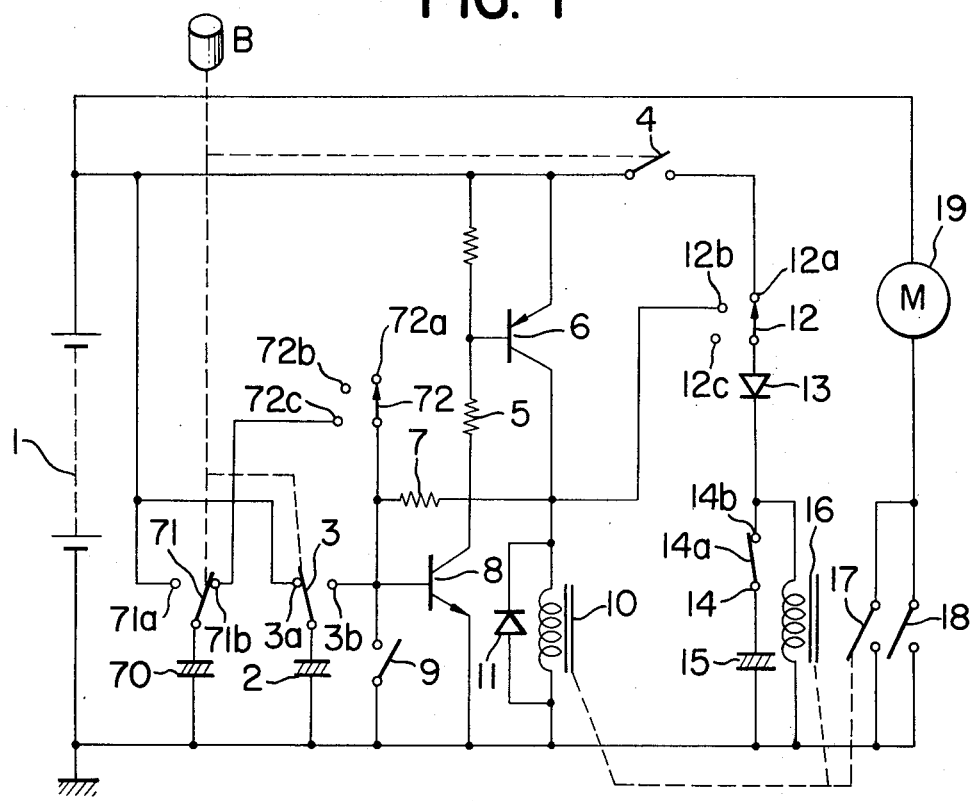
FIG. 1 is a circuit diagram of a first embodiment of the present invention.

Referring to FIG. 1 which shows a first embodiment of the present invention, both a first trigger switch 3, which has change-over contacts 3a and 3b, and a second trigger switch 4 are associated with a shutter release button B so that upon depression of the release button B, i.e. during operation of the camera, the first trigger switch 3 shifts to the contacts 3b while the second trigger switch 4 is closed and that upon release of the button B, i.e. during inoperative condition of the camera, the first trigger switch 3 shifts the contact 3a connected to the positive terminal of a power source 1 while the second trigger switch 4 is opened. A starting capacitor 2 for commencing the exposure is charged by the power source 1 when the trigger switch 3 is connected to the contacts 3a. A resistor 5, a pnp transistor 6, a resistor 7 and an npn transistor 8 together constitute a positive feedback circuit having bistable conditions such as SCR.

The base of the transistor 8 is connected to the contact 3b of the first trigger switch 3 and, when the first trigger switch is changed over to the contact 3b, the discharge current of the starting capacitor 2 will flow to the base of the transistor 8 to trigger the transistors 8 and 6 into conductive state.

A reset switch 9 is connected between the base and the emitter of the transistor 8 and maintained open during inoperative condition of the camera.

A trigger or starting electromagnet coil 10 is connected between the collector of the transistor 6 and the negative terminal of the power source 1.

A diode 11 is parallel-connected to the starting electromagnet coil 10 in order to absorb any inverse voltage produced across the coil 10 so as to prevent such inverse voltage from adversely affecting the operations of other component parts.

An exposure mode selection switch 12 has change-over contacts 12a, 12b and 12c. When the switch 12 is connected to the contact 12a, the continuous exposure mode is selected; when it is connected to the contact 12b, the single-frame exposure mode is selected; and when it is connected to the contact 12c, the bulb exposure mode is selected as will be described in detail hereinafter.

The trigger switch 4 is connected between the contact 12a of the switch 12 and the emitter of the transistor 6, and the junction between the switch 4 and the transistor 6 is connected to the positive terminal of the power source 1. The contact 12b is connected to the collector of the transistor 6 and the contact 12c is opened.

A diode 13 for preventing the reverse current, a timing switch 14 and a capacitor 15 are serially connected between the exposure mode selection switch 12 and the negative terminal of the power source 1.

An electromagnet coil 16 for holding an armature is connected between the negative terminal of the source 1 and the junction of the diode 13 and the timing switch 14. The starting electromagnet coil 10 has its number of coil turns and its resistance value selected such that it passes therethrough a great current to produce a magnetic force necessary to attract an armature 32b to be later described, and the holding electromagnet coil 16 has its number of coil turns and its resistance value selected such that it passes therethrough a small current to produce a magnetic force sufficient to keep attracting the armature 32b.

A motor switch 17 is so arranged that when a latching lever 17 to be later described is attracted by the electromagnet (10,16) the switch may be closed, thereby controlling a DC motor 19 connected in series with the motor switch 17.

Preferably, a phase switch 18 may be parallel-connected to the motor switch 17 to control a shutter driving mechanism to be described in more detail hereinafter. For the sake of explanation in conjunction with FIG. 2, the negative terminal of the power source 1 is shown as being grounded to a camera body.

A second starting capacitor 70 for terminating the exposure in the bulb exposure mode is connected between a third trigger switch 71 and the negative terminal of the power source 1. The third trigger switch 71 is so associated with the shutter release button B that upon depression of the button B, the third switch 71 is connected to the contact 71a to charge the capacitor 70 and that upon release of the button, the switch 71 is connected to the contact 71b.

A second exposure mode selection switch 72 has contacts 72a and 72b, which are opened, and a contact 72c connected to the contact 71b.

These contacts 72a, 72b and 72c correspond to the contacts 12a, 12b and 12c of the first exposure mode selection switch 12, respectively.

The continuous, the single frame and the bulb exposure modes are therefore selected when the switch 72 is connected to the contacts 72a, 72b and 72c, respectively.

Figure 2:
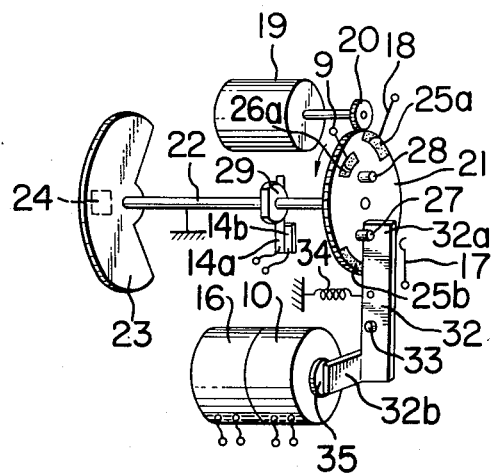
FIG. 2 is a perspective view of a mechanical mechanism of the embodiment.

Referring to FIG. 2, a mechanism operatively coupled to the circuit shown in FIG. 1 will be described.

A reduction gear 21 is made of an electrically conductive material, is carried by a main interlocking shaft 22 made of an electrically conductive material and may be driven from the motor 19 through a motor gear 20. The main shaft 22 carries, at one end thereof, a rotary shutter 23 for uncovering and covering an exposure opening or window 24 through which the exposure of film is made. In synchronism with one complete rotation of the gear 21, the opening and closing of the shutter 23 is effected and one-frame feed of the film is effected by unshown film transport means during closing of the shutter.

The gears 20 and 21, and shaft 22 and said unshown film transport means constitute a shutter driving mechanism for driving the shutter and transporting the film. A contact member 9 forming the reset switch and a contact member 18 forming the phase switch are in contact with one side surface of the gear 21 on different circumferences thereof. On that circumference of the reduction gear 21 which is contacted by the contact member 18, there are provided insulating plates 25a and 25b which are symmetrically located about the axis of rotation if the gear 21. On that circumference of the reduction gear 21 which is contacted by the contact member 9, there are provided insulating plates 26a and 26b which are symmetrically located about the axis of rotation.

The electically conductive reduction gear 21 and the insulating plates 25a, 25b, 26a and 26b thereon and the contact members 18 and 19 constitute the phase switch 18 and the reset switch 9 shown in FIG. 1, respectively, and the opening and closing of these switches are effected by rotation of the gear 21. A cam 29 made of an insulating material is carried by the main interlocking shaft 22, and a movable contact 14a resiliently pressed against the cam surface of the cam 29 and a stationary contact 14b together constitute the timing switch 14 which is opened and closed as the cam 29 rotates in unison with the reduction gear 21.

On said side surface of the reduction gear 21, there are provided a closed position projection 27 for stopping the shutter or the shutter driving mechanism (20, 21, 22) in a closed shutter position in which the shutter is completely closed and an open position projection 28 for stopping the shutter or the shutter driving mechansim (20, 21, 22) in an open shutter position in which the shutter is fully opened.

A latching lever 32 made of an electrically conductive material is pivotally supported on a pin 33 and has a pawl at one end thereof for engagement with the projection 27 or 28 and an armature 32b at the other end thereof. The latching lever 32 is biased counter-clockwise by a spring 34, which is made of an electrically conductive material, so as to engage the pawl 32a with the side surface of the gear 21, namely the projection 27 or 28. Since the spring 34 is grounded, the latching lever is at ground potential.

A core 35 is common to the starting and holding coils 10 and 16 and cooperates with these coils to form an electromagnet. When the core is energized by a current flowing through the coil 10, it attracts the armature 32b to rotate the latching lever 32 in the clockwise direction. Rotation of the lever 32 permits the pawl 32a to be disengaged from the projection 27 or 28 to allow the rotation of the gear 21 and simultaneously causes the lever to be made into contact with the movable contact 17 of the motor switch, thus closing the motor switch 17 to energize the motor 19.

Figure 3:
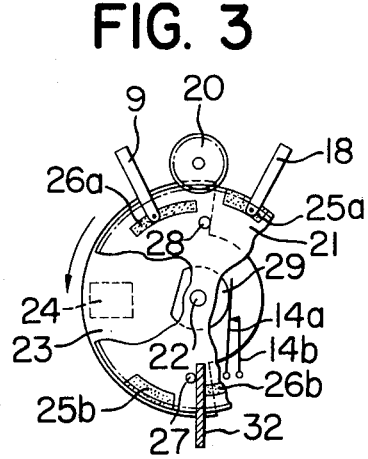
FIGS. 3 and 4 are views used for the explanation of the mode of operation of the first embodiment.
Figure 4:
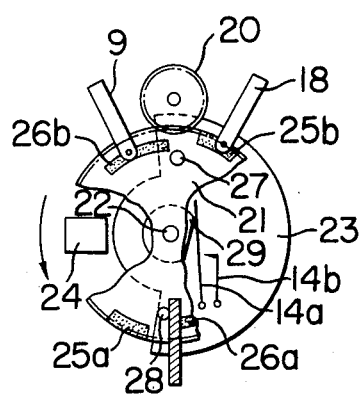

FIGS. 3 and 4 are the side view as seen from the right side of FIG. 2 to help understand the phase relationships between the switches in FIG. 2, and show the gear 21 partly cut-away. FIG. 3 shows a position in which the closed position projection 27 is engaged by the pawl 32a and FIG. 4 shows a position in which the open position projection 28 is in engagement with the pawl 32a. Arrow indicates the direction of rotation of the gear 21.

Figure 5:
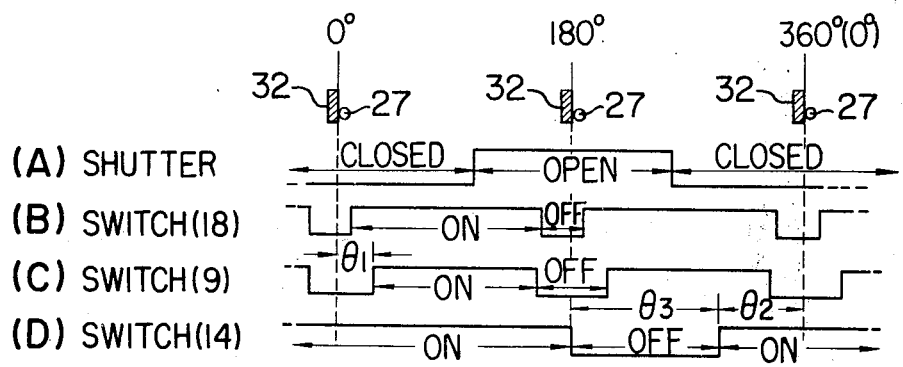
FIG. 5 is a phase chart used for the explanation of the relationship among the switches of the first embodiment.

FIG. 5 is a phase illustration showing the sequence of opening and closing of each switch and the shutter during one complete rotation of the gear 21 starting from the position in which the pawl 32a engages the closed position projection 27, such position being the zero-angle or reference position 0°. In FIG. 5, (A) indicates the sequence of opening and closing of the shutter, and (B), (C) and (D) indicate the sequence of opening and closing of the phase switch 18, the reset switch 9 and the timing switch 14, respectively.

Operation of the present electromagnetic trigger device will now be described.

The continuous exposure mode may occur when the selection switch 12 selects the contact 12a and when the selection switch 72 selects the contact 72a.

When, as shown in FIGS. 2 and 3, the closed position projection 27 is engaged by the pawl 32a to stop the shutter driving mechanism (20, 21, 22) in the closed shutter position, depression of the release button B closes the second trigger switch 4 and changes over the first trigger switch 3 from the contact 3a to the contact 3b.

As a result, the charge stored in the starting capacitor 2 flows out as a base current to a transistor 8, thereby rendering the positive feedback circuit 6, 8 conductive.

Conduction of the transistor 6 permits flow of a current to the starting coil 10 to thereby energize the core 35, which in turn attracts the armature 32b to rotate the latching lever 32 clockwise against the spring 34, as viewed in FIG. 2. The holding coil 16 is energized because it is connected to the power source through the switches 4 and 12 and the diode 13.

Since the timing switch 14 is closed as shown in (D) of FIG. 5, the capacitor 15 is charged through the diode 13. Charging of the capacitor 15 is immediately completed because of low forward resistance of the diode 13. When the armature 32b is attracted to the core 35, the projection 27 is disengaged from the pawl 32a and the motor switch 17 is closed, thereby energizing the motor 19 for rotation. The rotation of the motor 19 causes that of the gear 21. When the gear 21 is rotated through an angle θ1, the reset switch 9 is closed, as shown in (C) of FIG. 5, to thereby short-circuit the base-emitter of the transistor 8 to render the same transistors 6 and 8 non-conductive. The closing of the reset switch 9 also short-circuits the capacitor 2 to completely discharge it, so that even if the reset switch 9 is opened again, the transistors 6 and 8 are not rendered conductive but maintain non-conductive.

Therefore, there is no current flowing to the starting coil 10 but there is a current flowing to the holding coil 16 to maintain the core 35 continuously energized by the coil 16. Since this energization is sufficient to maintain the armature 32b in attracted condition, the armature 32b remain attracted and the motor 19 continues its rotation to effect the continuous exposure as long as the second trigger switch 4 is closed.

When the release button B is released to interrupt the continuous exposure, the first trigger switch 3 is changed over to the contact 3a and the second trigger switch 4 is opened. No current is, therefore, supplied from the power source 1 to the holding coil 16.

Considering the timing with which the release button B is released, the user releases the button B regardless of the position of the projection 27 or 28 relative to the pawl 32a and therefore, some contingency governs whether the pawl 32a is engaged with the closed position projection 27 namely the shutter driving mechanism (20, 21, 22) is latched in the closed shutter position or the pawl is engaged with the open position projection 28 namely the shutter driving mechanism is latched in the open shutter position.

In the embodiment of the present invention, this problem is solved by such a design that when the pawl 32a and the projection 27, 28 are in a specific relative position, the lever 32 is always returned into engagement with the closed position projection 27 by means of the capacitor 15 and the timing switch 14, whereby the shutter driving mechanism is stopped in the closed shutter position.

As shown by (D) in FIG. 5, the timing switch 14 is open from 180° position to (180° + θ3) position and closed in the other range of position. The angle represented by θ2 is the value of an angle of rotation of the gear 21 corresponding to a time slightly longer than the time required for the latching lever 32 to return from the position, in which the armature 32b is attracted to the core, to the position in which the pawl 32a is engageable with the projection 27 or 28. The capacity of the capacitor 15 is so selected that the discharge current flowing from the capacitor 15 to the holding coil 16 maintains the armature 32b attracted to the core 35 for a time longer than the time required for the gear 21 to rotate through the angle of (360° − θ3). If the release button B is released within the range θ3 in FIG. 5, no current will flow to the holding coil 16 since the second trigger switch 4 and the timing switch 14 are both open. Therefore, the latching lever 32 will be returned by the bias of the spring 34 to a latching position in which the pawl 32a is engageable with the side surface of the gear 21 to thereby open the motor switch 17, while the motor 19 will be energized through closure of the phase switch 18. Thereafter the phase switch 18 will be opened to prior to the position 360° to deenergize the motor 19 and engagement of the pawl 32a with the projection 27 stops the shutter driving mechanism 20, 21 and 22. Thus the shutter or the shutter driving mechanism is ensured to be stopped in the closed position. During the phase angle θ2, the timing switch 14 is closed, but the holding coil 16 produces the force sufficient only to keep attracting the armature 32b and cannot attract again the latching lever 32 which has been already separated from the core 35 and rotated in the counter clockwise direction. Therefore even when the current flows into the holding coil 16 due to the discharge of the capacitor 15 within the range θ2, the latching lever 32 will not be attracted by the holding coil 16.

When the release button B is released during the phase angle except θ3 shown in FIG. 5, the second trigger switch 4 is opened so that no current flows from the power source 1 into the holding coil 16. The timing switch is, however, closed and the capacity of the capacitor 15 is selected as described before, so that the capacitor 15 discharges across the holding coil 16 to maintain the armature 32b attracted to the core 35. When the timing switch 14 is opened; that is, when the reduction gear 21 reaches the relative angular position 180° shown by (D) in FIG. 5, the flow of the current through the holding coil 16 is interrupted by opening of the timing switch 14 so that the latching lever 32 is released from the core 35 and the pawl 32a is returned into engagement with the side surface of the gear 21. However, the open position projection 28 has already passed the pawl 32a so that the pawl 32a cannot be engaged with the projection 28, but is engageable only with the closed position projection 27.

The motor switch 17 is open, but closing of the phase switch 18 continues energization of the motor 19. Therefore, prior to the position 360°, the phase switch 18 is opened to deenergize the motor 19, and the shutter driving mechanism is stopped by engagement of the pawl 32a and the projection 27. Thus the shutter is always stopped at the closed position. In the foregoing description, even when the phase switch 18 is opened for a short time at the phase angle of 180°, the reduction gear 21 keep it rotation due to its inertia.

Next the single frame exposure mode will be described. The mode selection switches 12 and 72 are connected to the contacts 12b and 72b, respectively. When the release button B is depressed with the pawl 32a engaging the closed position projection 27, the first trigger switch 3 is changed over to the contact 3b, while the second switch 4 is closed. The starting capacitor 2 turns on the transistors 6 and 8 and the current flows through the starting coil 10 in the manner described above. The capacitor 15 is charged through the transistor 6, the selection switch 12, the diode 13 and the timing switch 14 because of connection of the switch 12 and the contact 12b. The current flows through the holding coil 16. By energization of the starting coil 10, the core 35 attracts the armature 32b to disengage the pawl 32a from the closed position projection 27, thereby closing the motor switch 17 to energize the motor 19. When the gear 21 is rotated through the phase angle $\theta 1$ in FIG. 5, the reset switch 9 is closed to render the transistors 6 and 8 non-conductive. Since the forward resistance of the diode 13 is low, the charging time of the capacitor 15 is so short that the capacitor is completely charged within the time required for the gear 21 to rotate through $\theta 1$.

By the turn-off of the transistor 6, no current flows into the starting coil 10. The timing switch 14 is however closed as shown by (D) in FIG. 5 and the capacity of the capacitor 15 is selected as described hereinbefore, so that the discharge current from the capacitor 15 flows through the timing switch 14 to the holding coil 16 to keep the armature 32b attracted to the core 35.

Since the discharge current from the capacitor 15 is blocked by the diode 13, it is not permitted to flow through the resistor 7. As a result, the motor 19 continues to rotate and, when the gear 21 reaches the position of 180° in FIG. 5, the timing switch 14 is opened to release the armature 32b from its attracted condition to thereby rotate the pawl 32a counter-clockwise in FIG. 2 and to return it to the engaging position in which it is engaged with the side surface of the gear 21.

However, the pawl 32a does not engage the open position projection 28 because this projection has passed this engaging position. Such rotation of the latching lever 32 opens the motor switch 17, but the motor 19 is driven through the phase switch 18 to the position 360° in which the pawl 32a engages the closed position projection 27, whereupon the motor and the shutter driving mechanism 20, 21, 22 are stopped in the closed shutter position by the engagement of the pawl 32a and the projection 27. Continued depression of the release button B will cause no change with the motor maintained inoperative. When the button B is released and depressed again, the reduction gear makes one rotation so that the shutter driving mechanism is stopped at the closed position in the manner described hereinabove. In this way, each depression of the release button causes the gear 21 to make a complete rotation to thereby effect film exposure and one-frame feed of the film, thus accomplishing single-frame exposure.

Bulb exposure mode will be described in which the exposure mode selection switches 12 and 72 are connected to the contacts 12c and 72c, respectively. When, as shown in FIGS. 2 and 3, the pawl 32a is in engagement with the closed position projection 27, depression of the release button B changes over the first trigger switch 3 from the contact 3a to the contact 3b, closes the second trigger switch 4 and changes over the third switch 71 from the contact 71b to the contact 71a.

The operation resulting from the connection of switch 3 and the contact 3b takes place in the same manner as previously described, so that the motor 17 is driven to rotate the gear 21. When the gear 21 is rotated through the angle $\theta 1$, the reset switch 9 is closed to render the transistors 6 and 8 non-conductive, thereby deenergizing the starting coil 10.

Since the second switch 12 has selected the non-connected contact 12c, the capacitor 15 is never charged so that when the transistors 6 and 8 are rendered non-conductive, no current flows into the holding coil 16 from the power source nor from the capacitor 15. Therefore, deenergization of the starting and holding coils 10 and 16 permits the latching lever 32 to be rotated counter-clockwise (in FIG. 2) by the spring 34 and to engage the side surface of the gear 21.

The rotation of the lever 32 causes the motor switch 17 to be opened, but because of closing of the phase switch 18 the motor continues to be energized.

The contact member 18 of the switch in FIG. 2 or 3 comes into contact with the insulating plate 25b immediately before the reduction gear 21 reaches the position 180°. Therefore, the phase switch 18 is open to deenergize the motor 19, and then the motor and the shutter driving mechanism 20, 21 and 22 are stopped in the open shutter position by engagement of the pawl 32a with the open position projection 28, as shown in FIG. 4. The motor 19 and the shutter driving mechanism remain stopped in the open shutter position, that is the film remains exposed, as long as the release button B continues to be depressed.

When the release button B is released, the first trigger switch 3 is changed over to the contact 3a, the second trigger switch 4 is opened, and the third trigger switch 71 is changed over to the contact 71b. The second starting capacitor 70, which was charged through connection of the switch 71 and the contact 71a, is discharged through the switches 71 and 72 and the transistor 8. Since the reset switch 9 is open as shown in FIGS. 4 and 5, the discharge of the capacitor 70 renders the transistors 6 and 8 conductive to thereby energize the starting coil 10. By attracting operation of the core 35, the pawl 32a is released or disengaged from the open position projection 28 and the motor switch 17 is closed so that the motor 19 rotates to close the shutter. Such rotation of the motor 19 closes the reset switch 9 to render the transistors 6 and 8 non-conductive, so that the latching lever 32 is rotated counter-clockwise under the spring 34 in FIG. 2 to open the motor switch 17. The motor 19 continues to be energized because of closing of the phase switch 18, and is deenergized when the latter is opened prior to the position 360°. Engagement of the pawl 32a with the closed position projection 27 stops the shutter driving mechanism 20, 21 and 22 and the motor in the closed position. Thereafter, no successive exposure will be commenced, that is the shutter driving mechanism will remain stopped in the closed shutter position as long as the release button B remains released or is not depressed again. Thus, the bulb exposure is accomplished in which the film is exposed to light during depression of the release button B.

In this embodiment, the latching lever 32 and the two projections 27, 28 together serve to latch or stop the shutter driving mechanism 20, 21 and 22. However, similar operation may equally be achieved by providing a single projection similar to the projection 27 or 28 instead thereof, and by providing two latching levers similar to the latching lever 32 instead thereof, said two latching levers being symmetrically located about the axis of rotation of the gear 21, being controlled by the electromagnet 10, 16, 35 and being engageable with said single projection. In case where the phase switch 18 is eliminated, the shutter driving mechanism 20, 21, 22 and the motor 19 are so designed that the shutter driving mechanism may be driven or rotated by inertia of the mechanism and the motor to the position 360° (FIG. 5) when the motor 19 is deenergized through opening of the motor switch 17 following opening of the timing switch 14 in single-frame or continuous exposure mode, and that the mechanism may be driven to the position 180° or 360° by inertia of the motor and the mechanism, caused by rotation of the gear 21 during $\theta1$, when the motor 19 is deenergized through closure of the reset switch 19 in bulb exposure mode.

Instead of provision of the timing switch 14 and the capacitor 15 which ensures that in the continuous and single-frame exposure modes the pawl 32 is never engaged with the projection 28 but is engaged with only the projection 27, there may be employed, for example, a mechanism having a rod which is so interlocked with the selection switches 12 and 72 that the rod is extended or projected from the side surface of the gear 21 to engage the pawl 32a when the switches 12 and 72 select the contacts 12c and 72c, respectively, and is retracted from the side surface of the gear 21 not to engage the pawl 32a when the switches 12 and 72 select the contacts 12a or 12b and 72a or 72b, respectively.

Figure 6:
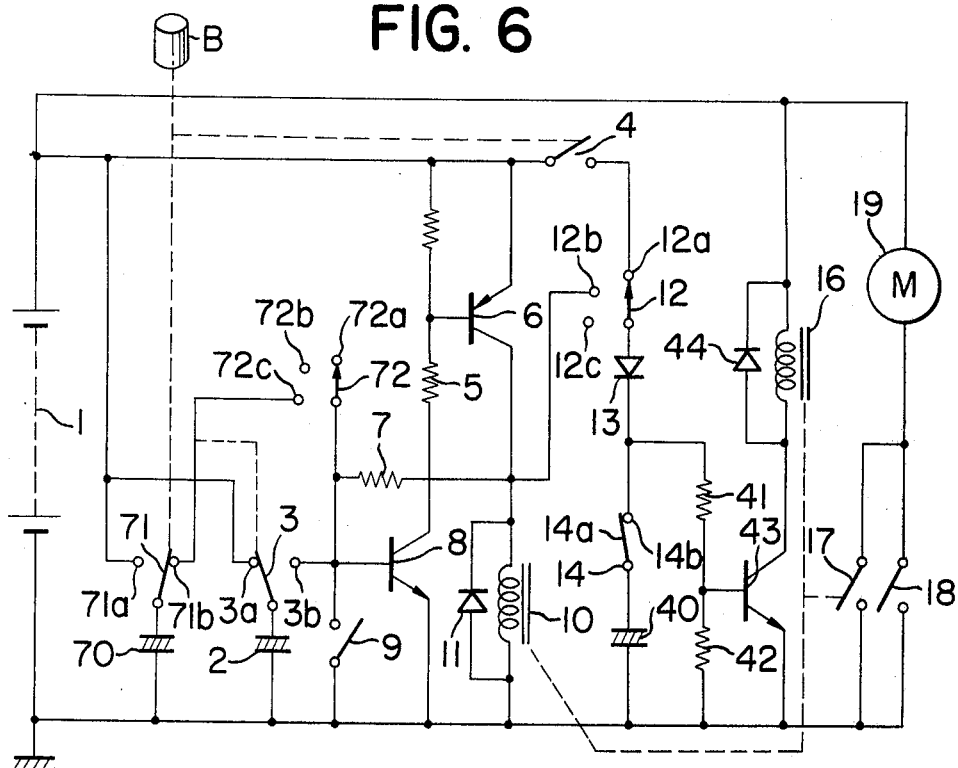
FIGS. 6, 7 and 8 are circuit diagrams of a second, third and fourth embodiments, respectively, of the present invention.

FIG. 6 shows a second embodiment of the present invention. In the first embodiment of FIG. 1, the capacitor 15 must be of a great capacity when the holding coil is of a low resistance, and thus the capacitor must necessarily be large in size. The second embodiment of FIG. 6 solves this problem by using, transistor 43 for switching of the holding coil. More particularly, as shown in FIG. 6, a serial connection of resistors 41 and 42 is connected between the cathode of the diode 13 and the negative terminal of the power source 1, and the transistor 43 has its base connected to the junction between the resistors 41 and 42, its emitter connected to the negative terminal of the power source 1, and its collector connected to the positive terminal of the source 1 through the holding coil 16. A diode 44 is parallel-connected to the holding coil 16 to absorb any inverse voltage produced across the holding coil 16. A capacitor 40 has function similar to the capacitor 15 of FIG. 1, with the exception that the capacitor 40 is discharged through the resistors 41 and 42 to render the transistor 43 conductive, thereby energizing the holding coil 16. Since the base current of the transistor 43 which renders the transistor 43 conductive is small, the capacity of the capacitor 40 may be made smaller than that of the capacitor 15 and the capacitor 40 may be decreased in size. Like the capacitor 15 of FIG. 1, the capacity of the capacitor 40 is so selected that discharge current therefrom maintains the transistor 43 conductive to thereby permit a flow of current from the source 1 to the holding coil 16 (namely, to thereby maintain the armature 32b attracted to the core 35) for a time longer than the time required for the gear 21 to rotate through the angle of $(360° - \theta3)$.

Figure 7:
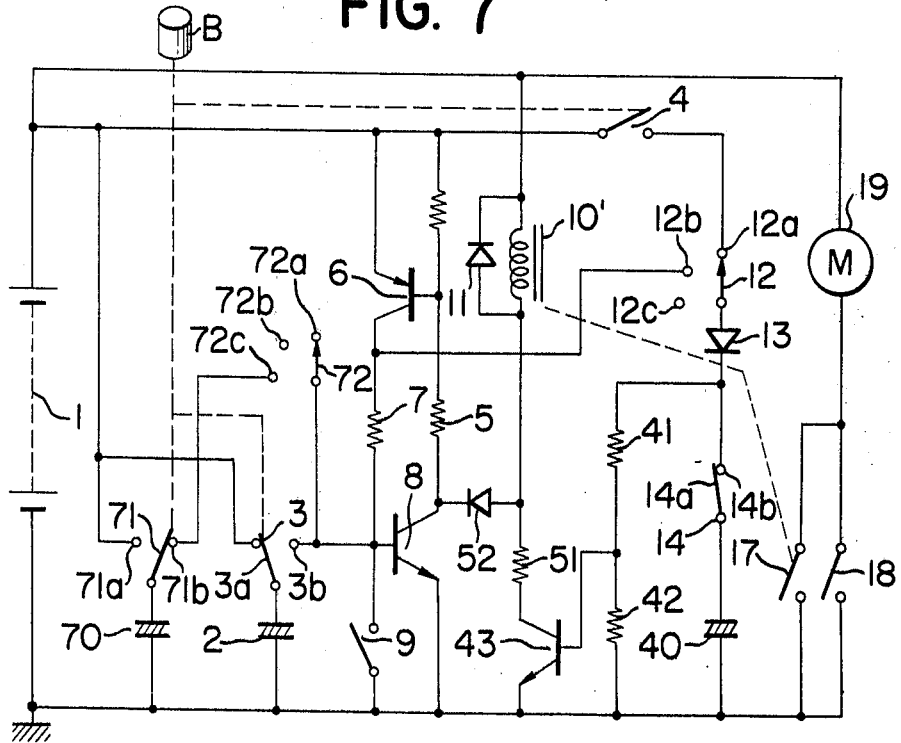

FIG. 7 shows a third embodiment of the present invention. In the first and second embodiments of FIGS. 1 and 6, the starting coil 10 and the holding coil 16 are employed for the electromagnet, whereas in the present embodiment a coil 10' along which functions not only as a starting coil but also as a holding coil is employed. Since only one coil is employed in the third embodiment, the electromagnet with a less volume may be used. The actuating-holding coil 10' has one end connected to the positive terminal of the source 1 and the other end connected to the collector of the transistor 8 through an inverse current blocking diode 52 and connected to the collector of the switching transistor 43 through a current limiting resistor 51. Another components of the circuit in FIG. 7 are similar to that in FIG. 6.

The continuous exposure mode will be described in which the selection switches 12 and 72 select the contacts 12a and 72a, respectively. When the release button B is depressed with the pawl 32a engaging the closed position projection 27 as shown in FIG. 2 or 3, the transistor 6 and 8 are rendered conductive by the capacitor 2 as described in connection with FIG. 1. The transistor 43 also is rendered conductive because a current flows from the power source 4 to the base of the transistor 43 through the switch 4, 12 and the resistor 41. Therefore the starting-holding coil 10' is energized by the sum of a great current flowing through the diode 52 and the transistor 8 and a small current flowing through the resistor 51 and the transistor 43, to thereby disengage the pawl 32a from the closed position projection 27 and permit the gear 21 to be rotated by the motor 19. When the gear 21 has rotated through the angle $\theta1$, the reset switch 9 is closed to turn off the transistor 6 and 8, so that said great current is cut off. However, since said small current still flows to the starting-holding coil 10' through the resistor 51 and the transistor 43, the core 35 maintains the armature 32b attracted thereto. That is, said small current serves as a holding current. Conduction of the transistor 43 does not render the transistor 6 or the positive feedback circuit 6, 8 conductive because of the presence of the diode 52. Thus, the holding current flows to the starting-holding coil 10' to maintain the attracted condition of the armature so as to permit continuous exposure to occur as long as the release button is depressed. When the release button B is released within the range θ3 in FIG. 5, the latching lever 32 will immediately return to the latching position in the same manner as described with respect to FIG. 1. When the button B is released without the range θ3, the discharge current from the capacitor 40 retains the transistor conductive to energize the coil 10' until the timing switch 14 is opened at the position 180°, and by opening of the timing switch 14, the latching lever 32 returns to the latching position. Therefore, the latching lever 32 engages the closed position projection 27 to stop the shutter driving mechanism in the closed shutter position whenever the button is released.

The single-frame exposure will be described. When the release button B is depressed, the discharge current of the capacitor 2 renders the transistors 6 and 8 conductive to energize the starting-holding coil 10' and to charge the capacitor 40 through the selection switch 12 connected to the contact 12b. Rotation of the gear 21 through the angle θ1, closes the reset switch 9 to thereby render the transistors 6 and 8 non-conductive, but the discharge current from the capacitor 40 retains the transistor 43 conductive, so that the small or holding current energizes the starting-holding coil 10' to retain the armature 32b attracted to the core 35. Thereafter, the operation, which occurs after the timing switch 14 is opened at the position 180°, is similar to that of the first embodiment.

The bulb exposure will be described. In this exposure mode, since the selection switch 12 is connected to the non-connected contact 12c, the capacitor 40 is never changed and no current flows to the resistors 41 and 42 so that the transistor 43 is always non-conductive. Therefore since a current flowing to the starting-holding coil 10' is controlled depending on condition of the transistor 8, that is, the coil 10' is energized only when the transistor 8 is conductive, the shutter driving mechanism is maintained in the shutter open position as shown in FIG. 4 to expose the film during depression of the release button B in the same manner as described in the first embodiment. Thereafter, when the release button B is released, the third trigger switch 71 is changed over from the contact 71a to the contact 71b, so that the discharge current from the starting capacitor 70 flows to the transistor 8 through the switch 72 to render the transistor 8 conductive, thereby energizing the motor 19 to close the shutter. Thereafter the shutter driving mechanism 20, 21, 22 is stopped in the shutter closed position.

Figure 8:
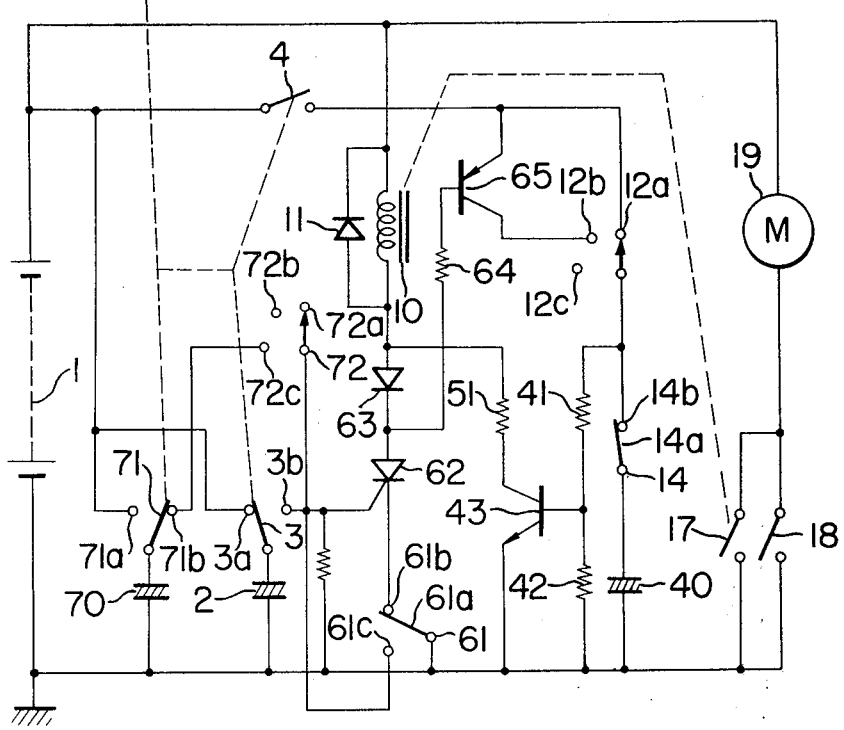

FIG. 8 shows a fourth embodiment of the present invention. In this embodiment, the magnet coil is the starting-holding coil 10 alone as in the third embodiment, and as SCR instead of the transistors 6, 8 is used for switching of the current flowing to the coil 10'. The starting-holding coil 10' has one end connected to the positive terminal of the power source 1 and the other end connected to the anode of the SCR 62 through an inverse current blocking diode 63. The cathode and gate of the SCR 62 are connected to a contact 61b of reset switch 61 and the contact 3b, respectively. The reset switch 61 is inserted between the cathode of the SCR 62 and the negative terminal of the power source 1 to reset the SCR 62 from its conductive state to its non-conductive state, and has contacts 61b, 61c so as to short-circuit the capacitor 2 or 70 to permit quick discharging of the capacitor 2 or 70. The movable contact 61a of the reset switch 61 is connected to the negative terminal of the source 1. Transistor 65 for charging of the capacitor 40 during single-frame exposure has its emitter connected to the positive terminal of the power source through the second trigger switch 4, its collector connected to the contact 12b, and its base connected to the junction between the diode 63 and the SCR 62 through a resistor 64.

Figure 9:
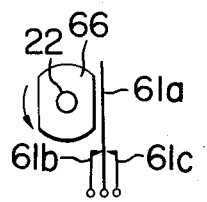
FIGS. 9 and 10 are views used for the explanation of the mode of operation of a reset switch in the fourth embodiment shown in FIG. 8.
Figure 10:
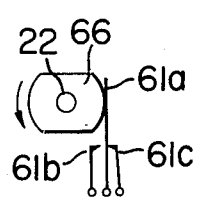

FIGS. 9 and 10 illustrate the construction and operation of the reset switch 61. Instead of the reset switch 9 of the FIG. 2, a cam 66 formed of insulating material is mounted on the main interlocking shaft 22, and a springy movable contact or contact arm 61a is normally engaged with a contact 61b and may be changed over into engagement with a contact 61c by the cam 66. In the interruption mode of the shutter driving mechanism shown in FIG. 3 or 4, the movable contact 61a is made into contact with the contact 61b as shown in FIG. 9, but when the motor 19 is driving, the movable contact 61a is made into engagement with the contact 61c by a convex portion of the cam 66 as shown in FIG. 10.

When the selection switches 12 and 72 select the contacts 12a and 72, respectively, namely the mode of the continuous exposure is selected, the operation will occur in the manner described below. Depression of the release button B renders the SCR 62 conductive by the capacitor 2 to permit a current to flow to the starting-holding coil 10' through the diode 63, SCR 62 and reset switch 61 connected to the contact 61b. Energization of the coil 10' disengages the pawl 32a from the projection 27 to permit the motor 19 and the gear 21 to rotate. When the gear is rotated through angle θ1, of FIG. 7, the reset switch 61 is changed over to the contact 61c to turn off the SCR 62 and to short-circuit the capacitor 2 for discharge thereof. The starting-holding coil 10' maintains the armature 32b attracted to the core 35, because of conduction of the transistor 43, to permit rotation of the motor 19 as long as the button is kept depressed. When the release button is released, the pawl 32a never fails to engage the closed position projection 27 through the operation of the timing switch 14 and of the capacitor 40, as previously described, and the shutter driving mechanism is stopped in the closed shutter position.

When the selection switches 12 and 72 select the contacts 12b and 72b, namely, the mode of the single-frame exposure is selected, depression of the release button B renders the SCR 62 conductive to energize the motor 19, as described hereinbefore. Since the transistor 65 also is rendered conductive the capacitor 40 is charged through it. Change-over of the reset switch 61 to the contact 61c turns off the SCR 62 and then renders the transistor 65 non-conductive. However, since the transistor 43 maintains conductive because discharge of the capacitor 40, the armature 32b is maintained attracted to the core 35. At this time the transistor 65 is not rendered conductive by conduction of the transistor 43, because of the inverse current blocking diode 63. Thus, as previously described, the latching lever 32, when it has passed the 180° position of FIG. 5, is returned to the latching position for engagement with the closed position projection 27 by the open of the timing switch 14, and the shutter driving mechanism 20, 21, 22 is stopped in the 360° position or in the closed shutter position. Thereafter, continued depression of the release button B will cause no change and thus, each depression of the button will result in the single-frame exposure.

When the selection switches 12 and 72 select the contacts 12c and 72c, respectively, namely, the bulb exposure is selected, depression of the release button B renders the SCR 62 conductive to energize the motor 19. Change-over of the reset switch 61 to the contact 61c deenergizes the starting-holding coil 10' because the transistor 43 remains non-conductive. Therefore, the latching lever 32 is returned to the latching position and the shutter driving mechanism is stopped in the 180 position namely in the open shutter position by engagement of the pawl 32a with the open position projection 28 as shown in FIG. 4. Continued depression of the button B maintains this condition. When the button B is released, the third trigger switch 71 is changed over to the contact 71b so that the SCR 62 is rendered conductive to energize the motor 19 because the reset switch 61 has been changed over to the contact 61b as shown in FIG. 9. Thereafter, when the reset switch 61 is changed over to the contact 61c, the starting-holding coil 1' is deenergized so that the shutter driving mechanism 20, 21, 22 is stopped in the 360° position by engagement of the pawl 32a with the closed position projection 27. Thus, the bulb exposure is accomplished.

The previous embodiments has its advantage in that the capacity of the capacitors 2 and 70 is smaller than that of a fifth embodiment to be described that is the capacitors 2 and 70 are smaller in size because they serve to render the positive feedback circuit 6 and 8 or the SCR 62 conductive.

Figure 11:
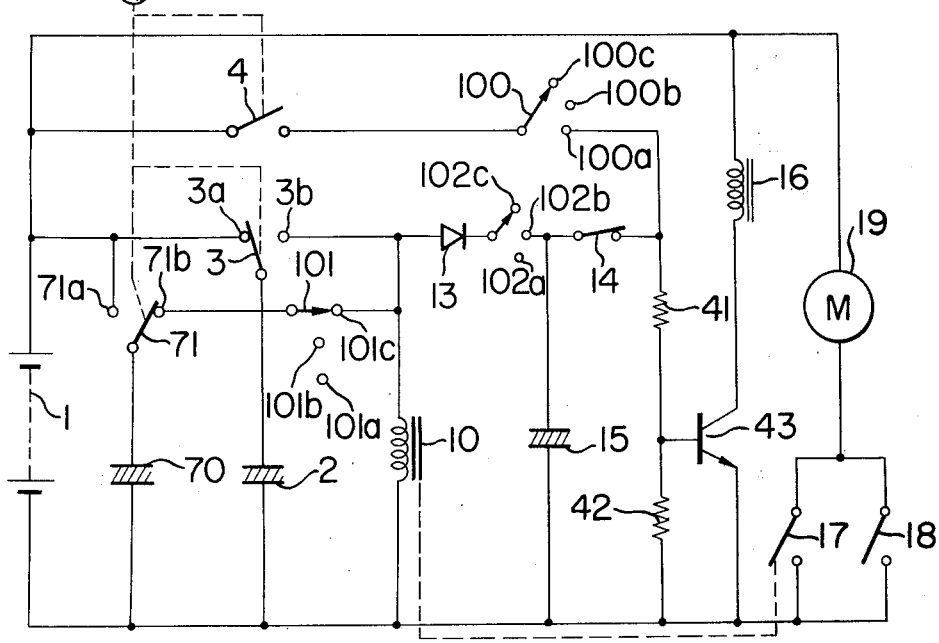
FIG. 11 is a circuit diagram of a fifth embodiment of the present invention.

FIG. 11 shows a fifth embodiment of the present invention. This embodiment eliminates the positive feedback circuit 6 and 8 or 62 and the reset switch 9 or 61 employed in the previous embodiments and instead, utilizes the starting capacitor 2 alone to perform their functions. In FIG. 11, the starting capacitor 2 is discharged directly through the starting coil 10 by the operation of the trigger switches 3 and 4 so as to provide thereto a flow of current sufficient to attract the latching lever 32 to the core 35. The capacity of the capacitor 2 is so selected that the time required for the discharge current to flow out is substantially equal to the time θ1 required for the reset switch 9 or 61 of the previous embodiments to be closed.

Continuous exposure will be described in which selection switches 100, 101, and 102 select contacts 100a, 101a and 102a, respectively. Depression of the release button B changes over the trigger switches 3 and 71 to the contacts 3b and 71a, respectively, and closes the trigger switch 4, as previously described. The discharge current from the capacitor 2 flows to the starting coil 10 to disengage the pawl 32a from the closed position projection 27, thereby closing the motor switch 17 and energizing the motor 19 in the same manner as previously described. The closure of the switch 4 permits the capacitor 15 to be charged by the power source 1 through the switch 100 and the timing switch 14 and permits conduction of the transistor 43. A holding current flows from the power source 1 to the holding coil 16 through the transistor 43, so that continuous exposure can occur as long as the release button is depressed. If the release button B is released within the range θ3 of FIG. 5 in which the timing switch 14 is open, there is no current flowing to the base of the transistor 43 from the capacitor 15 nor from the power source 1, so that the transistor 43 is rendered non-conductive to therby stop the shutter driving mechanism 20, 21, 22 in the closed shutter position, as previouslu described. If the release button B is released within the range except θ3, a discharge current from the capacitor 15 flows to the base of the transistor 43 through the switch 14, so that the shutter driving mechanism is stopped in the closed shutter position in the same manner as described on the previous embodiments.

Single-frame exposure will be described in which the selection switches 100, 101 and 102 select the contacts 100b, 101b and 102b, respectively. When the button B is depressed, the discharge current from the capacitor 2 energizes the starting coil 10 to rotate the motor 19 and simultaneously charges the capacitor 15 through the inverse current blocking diode 13 and the switch 102. After the discharge current from the capacitor 2 is exhausted to deenergize the coil 10, the discharge current from the capacitor 15 renders the transistor 43 conductive to thereby energize the holding coil 16. Thus, as previously described, the shutter driving mechanism never fails to be stopped in the closed shutter position after one-frame exposure has been completed.

Bulb exposure will be described in which the switches 100, 101, and 102 select the contacts 100c, 101c and 102c, respectively. When the button B is depressed, the coil 10 is energized to rotate the motor 19 but the capacitor is not charged because of opening of the two switches 100 and 102. Since the transistor 43 is maintained non-conductive and therefore the holding coil 16 is maintained deenergized, deenergization of the starting coil 10 permits the latching lever 32 to return to the latching position. Therefore, as described hereinbefore, the shutter driving mechanism is stopped in the open shutter position by engagement of the pawl 32a with the open position projection 28. Thus, the film is kept exposed as long as the button B is depressed. When the button B is released, the switch 71 is changed over from the contact 71a to the contact 71b so that the discharge current from the capacitor 70 energizes the starting coil 10 to rotate the motor 19. Since the holding coil 16 is maintained non-conductive, the shutter driving mechanism 20, 21 and 22 is stopped in the closed shutter position.

I claim:
1. An electromagnetic trigger device in a motor-driven camera capable of a buld exposure in which a shutter is opened when a trigger switch means is moved to an operative position and is closed when said trigger switch means is moved to an inoperative position, said device comprising:
   1. a power source;
   2. a motor;
   3. trigger switch means;
   4. shutter driving means driven by said motor for driving a shutter and movable between a closed shutter position in which the shutter is completely closed and an open shutter position in which the shutter is completely open;
   5. latching means movable between a latching position and a non-latching position, said latching means being adapted, when moved to said latching position, to latch said shutter driving means which occupies one of the closed and open shutter positions;

6. a motor switch for electrically connecting said motor to said power source when said latching means is in the non-latching position;
7. electromagnetic means for attracting said latching means to move it to the non-latching when said electromagnetic means is energized;
8. first and second capacitors;
9. means for charging said capacitors;
10. and means responsive to said trigger switch means for connecting said first capacitor to said electromagnetic means to energize it for a predetermined time interval when said trigger switch means is moved to an operative position and for connecting said second capacitor to said electromagnetic means to energize it for a predetermined time interval when said trigger switch means is moved to an inoperative position, said first and second mentioned predetermined time intervals being shorter than the shorter of the time required for said shutter driving means to move from the closed shutter position to the open shutter position and the time required for said shutter driving means to move from the open shutter position to the closed shutter position.

2. An electromagnetic trigger device according to claim 1 wherein said charging means comprises means for charging said first capacitor when said trigger switch means is in the inoperative position, the first capacitor being discharged when said trigger switch means is in the operative position, and means for charging said second capacitor when said trigger switch means is in the operative position, said second capacitor being discharged when said trigger switch is in the inoperative position.

3. An electromagnetic trigger device according to claim 2 wherein said electromagnetic means includes a starting coil, and a switching circuit for connecting said starting coil to said power source when said circuit is conductive, and wherein said connecting means comprises means for connecting said first capacitor to said switching circuit to render it conductive for said first mentioned predetermined time interval when said trigger switch means is moved to the operative position and means for connecting said second capacitor to said switching circuit to render it conductive for said second mentioned predetermined time interval when said trigger switch means is moved to the inoperative position.

4. An electromagnetic trigger device according to claim 3 wherein said electromagnetic means further includes a reset switch interlocked to said shutter driving means for rendering said switching circuit non-conductive.

5. An electromagnetic trigger device according to claim 4 wherein said switching circuit is a bistable circuit.

6. An electromagnetic trigger device according to claim 2 wherein said electromagnetic means includes a starting coil and wherein said connecting means comprises means for selectively connecting the first capacitor and the second capacitor in parallel with said starting coil in response to operation of the trigger switch means.

7. An electromagnetic trigger device according to claim 1, further comprising:
a phase switch parallel-connected to said motor switch, and means responsive to said shutter driving means for causing said phase switch to be opened when said shutter driving means is in the closed and open shutter positions.

8. An electromagnetic trigger device according to claim 1 further comprising:
a selector member for selecting continuous exposure mode and bulb exposure mode;
a holding coil responsive to said selector member and said trigger switch means, said holding coil being energized to hold said latching means in the non-latching position when said selector member selects the continuous exposure mode and said trigger switch means is in the operative position; and
preventing means responsive to said selector member, said preventing means preventing said latching means from latching said shutter driving means which occupies the open shutter position when said selector member selects the continuous exposure mode.

9. An electromagnetic trigger device according to claim 8 wherein said preventing means includes a circuit for energizing said holding coil and a timing switch, said timing switch being interlocked with said shutter driving means to be opened for a part of a time interval required for said shutter driving means to move from the open shutter position to the closed shutter position, said energizing circuit energizing said holding means when said trigger switch means is in the inoperative position and when said timing switch is closed.

10. An electromagnetic trigger device according to claim 9, wherein said energizing circuit includes a capacitor connected in parallel with said holding coil through said timing switch, the discharge current from said capacitor energizing said holding coil.

11. An electromagnet trigger device according to claim 9 wherein said energizing circuit includes
switching means for connecting said holding coil to said power source and a capacitor connected to said switching means through said timing switch,
the discharge current from the capacitor rendering said switching means conductive.

12. An electromagnetic trigger device according to claim 9 wherein said timing switch is opened when said shutter driving means reaches the open shutter position, the last-mentioned time interval having a remaining part in addition to the first-mentioned part and the remaining part of said time interval being longer than the time required for latching means to move from the non-latching position to the latching position.

13. An electromagnetic trigger device according to claim 1, wherein said latching means includes a latching member movable between the latching and non-latching positions, and first and second engaging means rotatable in unison with said shutter driving means, said latching member being attracted by energization of said electromagnetic means to be moved from the latching position to the non-latching position, and being, when in said latching position, engageable with said first or said second engaging means to latch said shutter driving means in the closed shutter position or in the open shutter position, respectively.

14. An electromagnetic trigger device according to claim 13, wherein said shutter driving means includes a rotatable member which makes a complete rotation during one-frame exposure of the shutter, and said first and second engaging means are fixed on said rotatable member and positioned symmetrically with respect to the axis of rotation of said rotatable member.

15. An electromagnetic trigger device according to claim 1, including means interlocking said motor switch with said latching means and causing said motor switch to be closed when said latching means reaches the non-latching position.

16. An electromagnetic trigger device according to claim 1 further comprising means for biasing said latching means to the latching position.

* * * * *